UNITED STATES PATENT OFFICE.

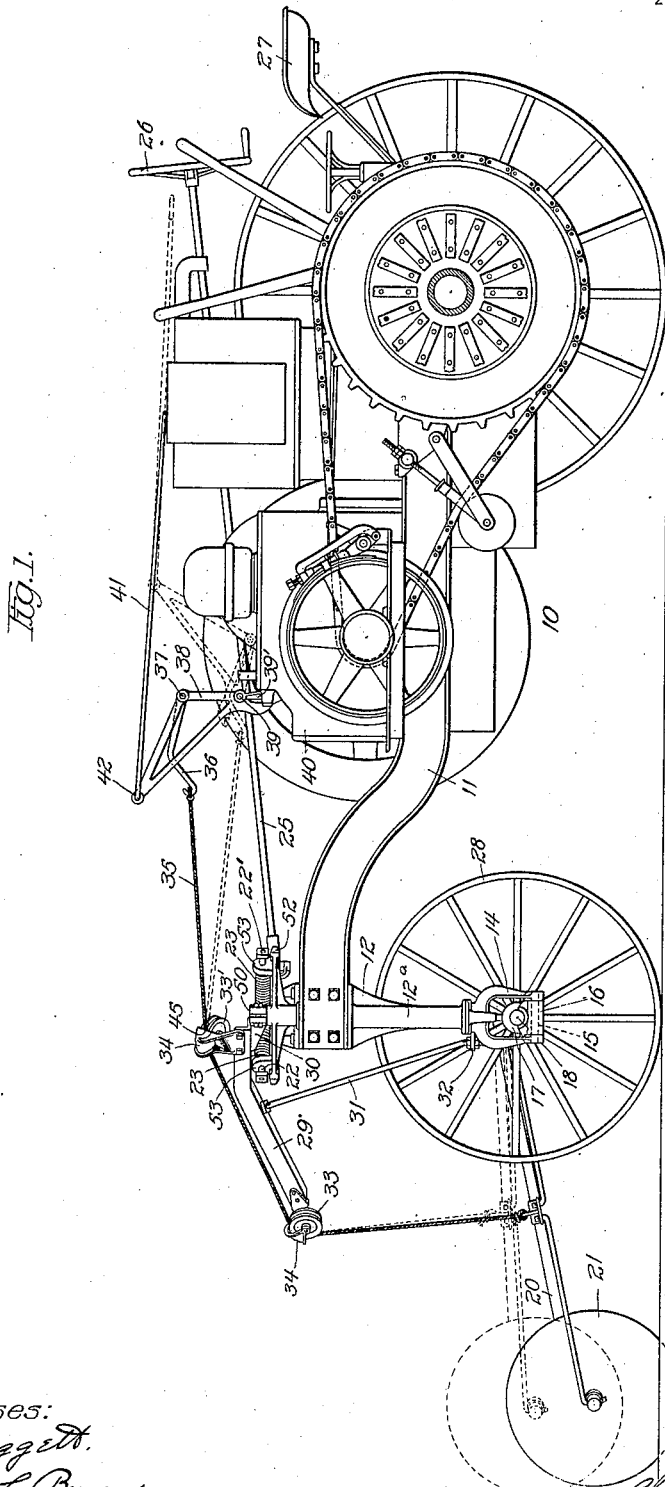

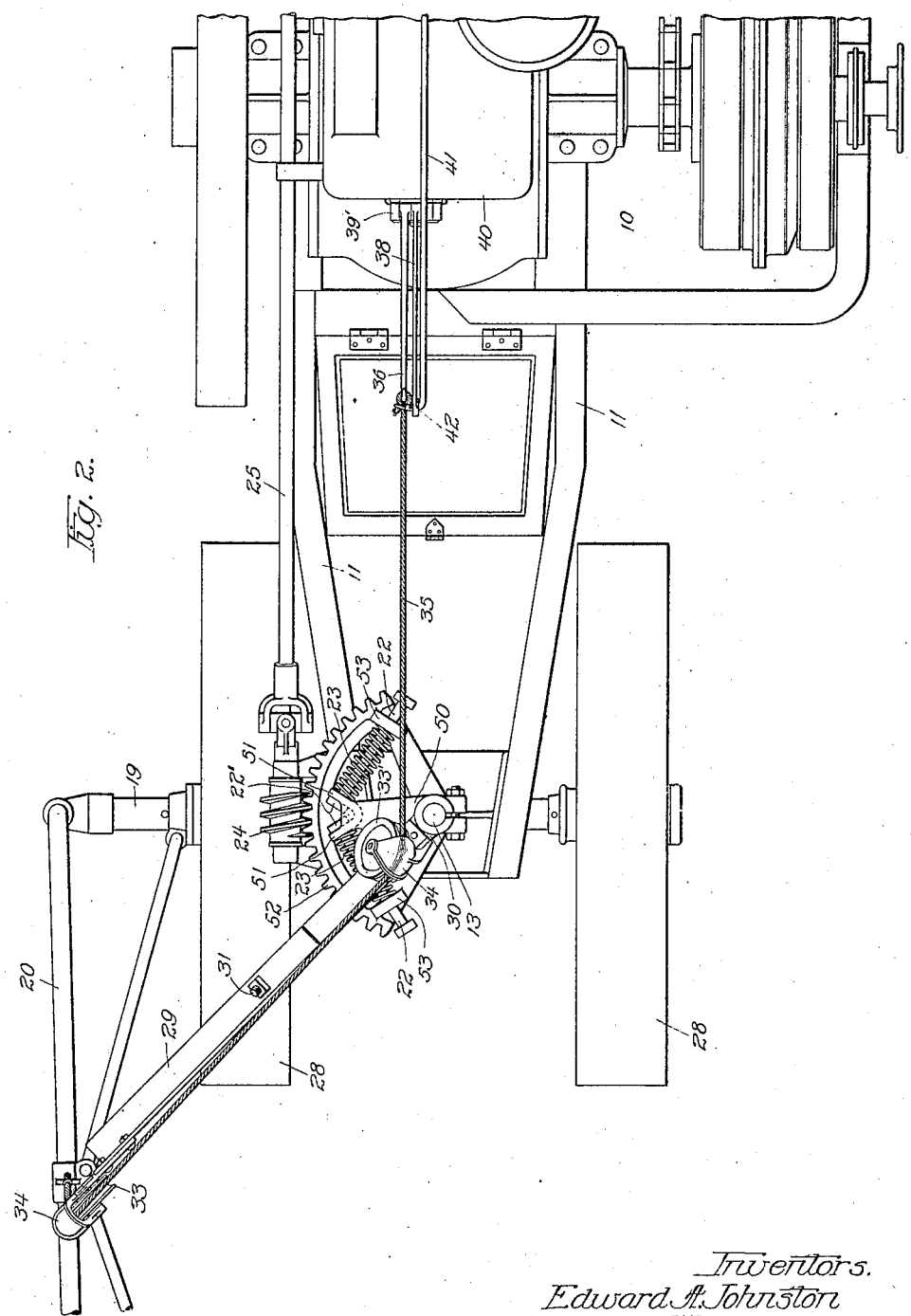

EDWARD A. JOHNSTON AND EDMUND J. KANE, OF CHICAGO, ILLINOIS, ASSIGNORS, BY MESNE ASSIGNMENTS, TO INTERNATIONAL HARVESTER COMPANY, A CORPORATION OF NEW JERSEY.

TRACTOR STEERING MECHANISM.

1,351,759.   Specification of Letters Patent.   Patented Sept. 7, 1920.

Application filed February 11, 1915. Serial No. 7,469.

*To all whom it may concern:*

Be it known that we, EDWARD A. JOHNSTON and EDMUND J. KANE, citizens of the United States, and residents, respectively, of Chicago, in the county of Cook and State of Illinois, and of Chicago, in the county of Cook and State of Illinois, have invented certain new and useful Improvements in Tractor Steering Mechanism, of which the following is a full, clear, and exact specification.

This invention relates to tractors, and more particularly to tractor steering mechanism.

The objects of this invention are to simplify and properly support tractor steering mechanism, and to simplify the raising, lowering and locking means of said mechanisms.

These objects are accomplished by providing the construction disclosed in the accompanying sheets of drawings, in which—

Figure 1 is a side elevation of a tractor embodying our invention; and

Fig. 2 is a plan view of the same tractor.

The various novel features of our invention will be apparent from the following description and drawings, and will be particularly set forth in the appended claims.

Our invention is here disclosed in connection with a tractor 10, having side frame members 11, having raised front portions terminating in a shaft support 12, in the tubular portion 12$^a$ of which is movably mounted a shaft 13. Formed integrally with the lower end of the shaft 13 is a fork member 14, having openings through which passes a pin 15, which also passes through a sleeve portion 16 of the member 17 mounted on the front axle 18 of the tractor. The front axle 18 has an extension 19, to which is pivotally connected the forwardly projecting frame 20 of any suitable automatic furrow pilot steering device having a furrow pilot wheel 21. Mounted on and secured to the upper end of the shaft 13 is an arm 50 having lugs 51. Loosely mounted upon the same shaft 13, adjacent the arm 50, is a worm gear 52 having lugs 53. Passing through the lugs 51 and 53 are two rods 22 having heads 22$^1$ at their ends and around which rods 22, intermediate the lugs 51 and 53, are springs 23 for cushioning any jars which otherwise might be transmitted to the worm gear 52. Meshing with the worm gear 52 is a worm 24 operatively connected to one end of an operating shaft 25, having at its end an operating handle 26 located at the rear of the tractor near the operator's seat 27. It is seen that with this arrangement any steering movement transmitted from the operator's handle to the front axle 18 and the wheels 28 mounted thereon is yieldingly transmitted through the worm gear 52, springs 23, and arm 50.

For supporting the automatic furrow pilot steering device, especially in a raised position, a bracket 29 is secured to a portion 30 of the arm 50, said bracket 29 extending forwardly, downwardly and toward the furrow side of the tractor to a point over the frame 20. To properly brace the bracket 29, a rod 31 is connected to the bracket 29 and to a projection 32 formed on the front part of the fork member 14 of shaft 13. Secured to opposite ends of the bracket 29 are pulleys 33 and 33$^1$, having guiding housings 34, there being a cable 35 passing over said pulleys and having one end connected to the automatic steering frame 20. The other end of the cable 35 is connected to a hook 36 pivotally mounted at 37 to a lever member 38 pivoted in turn at 39 to a bracket 39$^1$ secured to the engine crank casing 40. An operating rod 41 is pivotally connected at 42 to the lever 38, whereby the furrow pilot steering wheel and frame may be raised and lowered, the lever 38 being swung about the point 39. As shown in full lines in Fig. 1 of the drawing, the furrow pilot wheel and frame are in their lowered position. To raise the furrow pilot wheel and frame, the operator draws back the rod 41, and the lever 38 is swung rearwardly until the pivotal point 37 takes a position such that a line drawn between the point 37, in its dotted line position in Fig. 1, and the point 45, where the cable 35 engages the rear pulley 33$^1$, falls below the pivot point 39. It will be apparent that with the lever 38 in this position, as shown in dotted lines in Fig. 1, the furrow pilot wheel and its frame will be locked in raised position, and that, as the lever is thrown forwardly from the dotted line position, the pivotal point 37 will rise above the pivotal point 39, thereby liberating the furrow pilot wheel and its frame in a manner to permit them to fall by gravity. By means of this arrangement the steering mechanism is simplified and properly supported, and at the same time the raising and lowering and locking means of such mechanism are improved.

It is evident that there may be modifications of the invention as herein disclosed, and it is our intention to cover all such modifications which do not involve a departure from the spirit and scope of our invention.

What we claim as new is:

1. In tractor steering mechanism, an axle, a wheel thereon, furrow pilot steering means connected thereto on the furrow side of the wheel, a rotatable shaft operatively connected to said axle, and means connected to said shaft and rotatable therewith for supporting said furrow pilot steering means.

2. In tractor steering mechanism, means including a shaft for transmitting a steering movement, means independent thereof for automatically guiding a tractor, and means fastened to said shaft and movable therewith for supporting said guiding means.

3. In tractor steering mechanism, means including a rotatable shaft for transmitting a steering movement, means independent thereof for automatically guiding a tractor, a member connected to said shaft and movable therewith, and means coöperating with said member for raising said guiding means.

4. In tractor steering mechanism, means including a rotatable shaft for transmitting a steering movement, means independent thereof for automatically guiding a tractor, a member connected to said shaft and movable therewith, means coöperating with said member for raising said guiding means, and means whereby said guiding means is locked in raised position.

5. In tractor steering mechanism, means including a rotatable shaft for transmitting a steering movement, means for automatically guiding a tractor, and means including two connected members extending from opposite ends of said shaft and movable therewith for supporting said guiding means.

6. In tractor steering mechanism, an axle a wheel thereon, furrow pilot steering means connected to said axle, a shaft operatively connected to said axle, an arm connected to said shaft, a hand operated gear member loosely mounted on said shaft and yieldingly connected to said arm, and a supporting means for said furrow pilot steering means connected to said arm.

7. In tractor steering mechanism, an axle, a wheel thereon, furrow pilot steering means connected to said axle, a shaft operatively connected to said axle, an arm connected to said shaft, a hand operated gear member loosely mounted on said shaft and yieldingly connected to said arm, a supporting member for said furrow pilot steering means connected to said arm, and means carried by said supporting member for raising said furrow pilot steering means.

8. In tractor steering mechanism, means including a shaft for transmitting a steering movement, means independent thereof for automatically guiding a tractor, means fastened to and rotatable with said shaft for supporting said guiding means, and a lever mechanism whereby the guiding means may be locked in a raised position.

9. In tractor steering mechanism, means including a shaft for transmitting a steering movement, means independent thereof for automatically guiding a tractor, a member connected to said shaft adapted to be maintained substantially over the automatic guiding means at all points in its swing, and means carried by said member for raising the automatic guiding means.

10. In tractor steering mechanism, means including a shaft and a wheel for transmitting a steering movement, furrow guiding means independent thereof for automatically guiding a tractor and located on the furrow side of the wheel, a member connected to said shaft adapted to be maintained substantially over the automatic guiding means at all points in its swing, and means carried by said member for raising the automatic guiding means.

11. In tractor steering mechanism, means including a ground wheel movable about a vertical axis for steering said tractor, automatic steering means associated with said wheel, and means swinging about a vertical axis and maintained substantially above the automatic steering means, said swinging means having associated therewith means adapted to raise the automatic means.

12. In tractor steering mechanism, means including a ground wheel movable about a vertical axis for steering said tractor, automatic steering means associated with said wheel, and means swinging about a vertical axis and maintained substantially above the automatic steering means, a flexible member associated with said swinging means and adapted to raise the automatic steering means.

13. In tractor steering mechanism, means including a ground wheel movable about a vertical axis for steering said tractor, automatic steering means associated with said wheel, and elevating mechanism for the automatic steering means comprising an element maintained above said automatic steering means and swinging therewith about the same vertical axis, and means attached to the steering means and coacting with said element.

14. In tractor steering mechanism, means including a ground wheel movable about a vertical axis for steering said tractor, automatic steering means associated with said wheel, and elevating mechanism for the steering means comprising an element maintained above said steering means and movable therewith about the same vertical axis, and a flexible member attached to the steering means and coacting with said element.

15. In a tractor steering mechanism, means including a ground wheel movable about a vertical axis for steering said tractor, automatic steering means associated with said wheel, and elevating mechanism for the steering means comprising an element maintained above said steering means and movable about the same vertical axis, a flexible member attached to the steering means and coacting with the said element to raise and lower the steering means, and means for locking the steering means in raised position.

In testimony whereof we affix our signatures, in the presence of two witnesses.

EDWARD A. JOHNSTON.
EDMUND J. KANE.

Witnesses:
 CHAS. L. BYRON,
 E. W. BURGESS.